June 8, 1926.
O. R. BRINEY
BUSHING MEANS
Filed Sept. 10, 1924
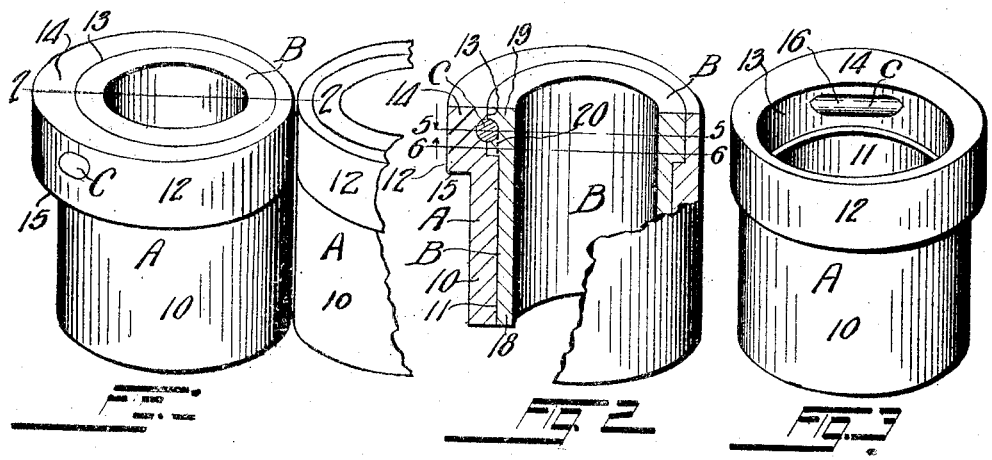
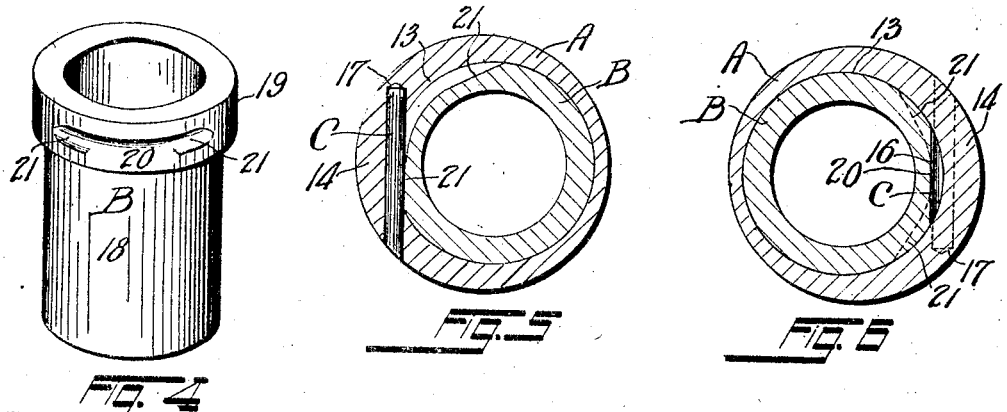
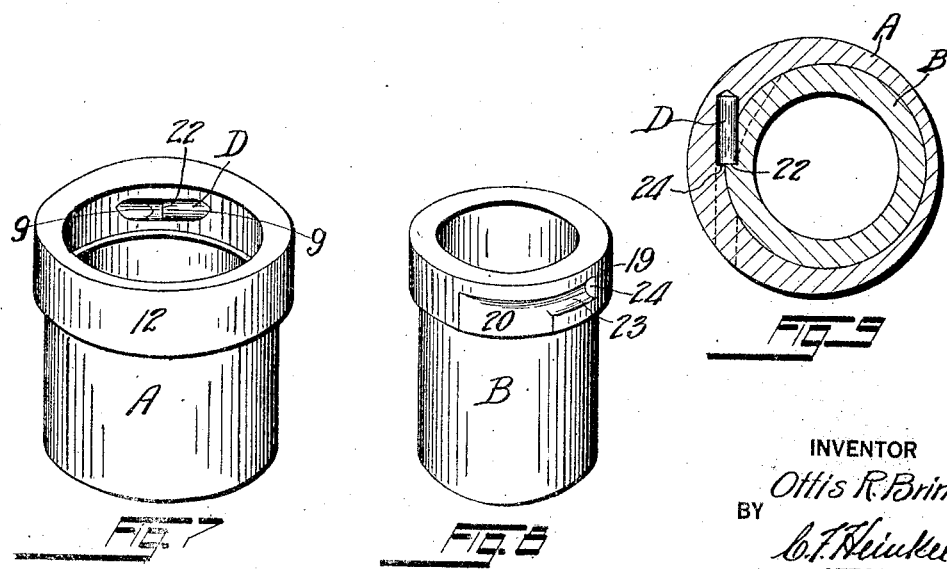
INVENTOR
Ottis R. Briney
BY
C. T. Heinkel,
ATTORNEY Patented June 8, 1926.

1,587,504

UNITED STATES PATENT OFFICE.

OTTIS R. BRINEY, OF PONTIAC, MICHIGAN.

BUSHING MEANS.

Application filed September 10, 1924. Serial No. 736,839.

My invention relates to bushing means in which one or more bushings telescope into each other and are insertable into or removable from each other.

The main object of my invention is a simple, efficient, and inexpensive telescoping bushing means which permits two or more bushings to be installed close together and still provide sufficient material in the bushings to install a locking means to retain the bushings in desired relation to each other. Other objects will become apparent during the description of the apparatus shown in the accompanying drawing.

In bushing means, such as guide bushings as used in drill jigs for instance, it is often quite necessary that the bushings must be installed close together so that closely spaced holes may be drilled in one setting or with one jig to eliminate additional handling of the job to be drilled, or additional jigs, or additional time otherwise required in drilling closely spaced holes. It is also quite necessary that the slip bushings are locked to the liner bushing to prevent the displacement thereof during operation and to prevent the loss thereof while handling the jig or other causes. It is also quite necessary that the cost of production of these bushings is kept low.

In the present invention, the parts themselves are very simple, no auxiliary means is required to retain the bushings in desired relation to each other, and all of the important portions of the bushings are concentric; the head only of one of the bushings is eccentric with the other portions of the bushings, but this head needs not fit closely into any portion of a bushing or of a jig or other fixture and requires no accurate machine work.

It is remarked here that the present formation of the bushings requires a minimum of material as well as a minimum of labor to form them. For instance, the bushing can be formed of bar stock of the same size as is required for the eccentric head and the body portion can be turned down to required diameter and the hole bored by using an eccentric collet or chuck and thereby completely machine the bushing in one operation and in one setting and, in consequence, save considerable time and, in consequence of the above, no material needs to be removed from the head and thereby forming the bushing out of a minimum of material.

The present invention is an improvement over the prior art in that it eliminates the time required to form eccentric heads and eccentric bores and counterbores, it requires less material to form the bushings, and permits two bushings to be installed close together without further operation on the bushings, and provides a convenient and economical means for installing a lock mechanism between a liner and slip bushing.

It is to be observed that the slip bushing may have an eccentric head and the locking means can then be mounted in the heavier portion of this head; in such cases, the head of the liner bushing may either be omitted or made only slightly larger than the body portion thereof so that two or more bushings may be installed close together. This arrangement is not shown in detail in the drawing but appears obvious to those skilled in the art.

I attain the above objects and advantages by the mechanisms illustrated in the accompanying drawing in which:

Fig. 1 is a perspective view of a guide bushing embodying the features of my invention and clearly showing the eccentric head on the liner bushing and also showing, adjacent to the guide bushing, a portion of a similar guide bushing with the thinner portions of both of the bushings adjacent to each other to indicate how two bushings may be installed close together.

Fig. 2 is a perspective view, similar to Fig. 1, partly in section on line 2—2 of Fig. 1, to clearly show a certain locking means mounted in the heavier portion of the liner bushing.

Fig. 3 is a perspective view of the liner bushing of Fig. 1 showing the stop pin in position.

Fig. 4 is a perspective view of the slip bushing of Fig. 1 showing the groove to engage the stop pin shown in Fig. 3.

Fig. 5 is a section, taken on a horizontal plane indicated by the line 5—5 in Fig. 2, showing the locking means more clearly with the slip bushing rotated to locked position in the liner bushing.

Fig. 6 is a section, taken on a horizontal plane indicated by the line 6—6 in Fig. 2, showing the locking means more clearly with the slip bushing in unlocked position in the liner bushing.

Fig. 7 is a perspective view of a liner bushing, similar to Fig. 3, showing a modification of the stop pin.

Fig. 8 is a perspective view of a slip bushing, similar to Fig. 4, showing the groove to engage the stop pin shown in Fig. 7.

Fig. 9 is a section, taken on a horizontal plane indicated by the line 9—9 in Fig. 7, showing the locking means of Figs. 7 and 8 more clearly with the bushings in locked position.

Similar reference characters refer to similar parts throughout the views.

The guide bushing shown in Figs. 1 to 6 is composed only of the liner bushing A, the slip bushing B, and the stop pin C in the head of the liner bushing.

The liner bushing A is formed with the body portion 10 having the longitudinal bore 11 concentric with the body portion and with the head 12 eccentric with the body portion and having the counterbore 13 concentric with the longitudinal bore 11 and with the body portion 10.

It is observed that the eccentricity of the head 12 provides the heavier portion 14 into which the locking means is mounted as will appear presently. It is further observed that one side of the body portion 10 and the head 12 are flush to enable two of these bushings to be installed close together as indicated in dotted lines in Fig. 1, and that the head 12 projects beyond the body portion 10 not quite all the way around to provide a shoulder 15 as is usual in such bushings.

The stop pin C is driven into the head 12 at the heavier portion thereof in such a position that the portion 16 traverses the counterbore 13 at one side so that the portion 16 projects partly into the counterbore 13.

It is observed that the pin C is driven into the head 12 from one side and through the heavier portion thereof and that the bottom 17 abuts the material of the head. The end of the pin C, adjacent the abutment 17, fits tight into the material of the head while one side of the portion 16 abuts the material of the head. This arrangement prevents the pin C from working loose and provides a rigid and substantial lock structure.

The slip bushing B is formed with the body portion 18 fitting into the bore 11 and with the head 19 fitting loosely into the counterbore 13.

The head 19 is provided with the flat spot 20 on one side and at the bottom of the head to clear the portion 16 of the pin C when the slip bushing is inserted into or removed from the liner bushing, the relation of the parts when in this position is clearly seen in Fig. 6. The grooves 21 extend from each side and from the top of the spot 20 to engage and abut the portion 16 upon partly rotating the slip bushing in the liner bushing in either direction to prevent further rotation of the slip bushing in the liner bushing (see Fig. 5) and to retain these bushings to each other longitudinally as seen in Fig. 2.

In Figs. 7, 8 and 9, I have shown a modification of the lock pin. In this instance, the liner bushing A and the slip bushing B are similar to the bushings previously described and the stop pin D is mounted in the head 12 similar to the stop pin C previously described, but the pin D is, in this instance, cut off at about the radial axis of the guide bushing, as seen in Fig. 9, to provide the square end 22.

The head 19 of the slip bushing B is here provided with the flat spot 20 as previously described, but the groove 23 is here provided only on one side of the spot 20 and is provided with the shoulder 24 abutting the end 22 to prevent the rotation of the slip bushing in the liner bushing.

In either of the cases illustrated, the slip bushing is prevented from rotation in the liner bushing and is prevented from longitudinal movement in the liner bushing by the stop pin engaging the groove.

Modifications other than those pointed out may be made within the scope of the appended claims; therefore, without limiting myself to the precise constructions and arrangement of elements shown and described and pointed out,

I claim:—

1. A liner bushing having a body portion and a head portion, and said head portion having a portion thereof projecting further beyond the side of said body portion than the remaining portion thereof to permit a plurality of liner bushings to be installed adjacently with a minimum center of distance between them.

2. An apparatus of the character described comprising, associable members, one of said members having a body portion and a head portion, said head portion having a portion thereof projecting further beyond the side of said body portion than the remaining portion thereof to permit a plurality of said one members to be installed adjacently with a minimum of center distance between them, and a lock means for said members mounted in the first mentioned portion of said head.

3. An apparatus of the character described comprising, associable members, one of said members having a body portion and a head portion and a counterbore in the head portion, said head portion having a portion thereof projecting further beyond the side of said body portion than the remaining portion thereof to permit a plurality of said one members to be installed adjacently with a minimum of center distance between them, the other of said members having a head adapted to said counterbore, and a lock means for said members mounted in the first mentioned portion of the head of said one member and engaging the head of said other member.

4. An apparatus of the character described comprising, telescoping members, one of said members having a body portion and a head portion, said head portion having a portion thereof projecting further beyond the side of said body portion than the remaining portion thereof to permit a plurality of said one members to be installed adjacently with a minimum of center distance between them, said one member having a longitudinal bore and a counterbore both concentric with said body portion thereof, the other of said members having a body portion adapted to the bore in said one member and a head adapted to the counterbore in said one member and having a groove, and a stop pin mounted in the first mentioned portion of the head on said one member and projecting into said counterbore to engage said groove in the head of said other member to lock said members to each other.

OTTIS R. BRINEY.